Jan. 14, 1936.    F. H. BANNER    2,027,573

METHOD OF MAKING WRIST PINS

Original Filed May 3, 1923

Inventor:
Frank H. Banner, dec'd
Beatrice A. Banner, Ex'trix
BY Neil W. Preston
HIS ATTORNEY.

Patented Jan. 14, 1936

2,027,573

UNITED STATES PATENT OFFICE 2,027,573

METHOD OF MAKING WRIST PINS

Frank H. Banner, deceased, late of Rochester, N. Y., by Beatrice A. Banner, executrix, Rochester, N. Y., assignor to General Railway Signal Company, Rochester, N. Y.

Original application May 3, 1928, Serial No. 274,932. Patent No. 1,876,550, dated September 13, 1932. Divided and this application July 19, 1932, Serial No. 623,382

2 Claims. (Cl. 29—156.5)

This invention relates in general to wrist pins, and has more particular reference to wrist pins furnished with lubricating means and having the body and head formed of separate pieces of material.

The present application is a division of the application of Frank H. Banner, Serial No. 274,932 filed May 3, 1928, now Patent 1,876,550 granted September 13, 1932.

The wrist pins forming the subject matter of the present invention can be used in any usual or desired connection such, for example, as forming an axle on which is mounted a rockable lever, or for connecting a crank arm to a connecting rod, etc.

In order to lessen the cost of manufacture it is desirable to form the wrist pin with a separate head, connected to the body, as in this manner the body can be formed from stock having the dimensions of the finished pin body, and thus avoid such machining. In connecting the head to the body, after a lubricating duct is formed in the body, the connection between the body and the head must be at such a point as to prevent the lubricating duct from weakening the connection.

At the same time it is most desirable to form a very rugged and durable construction, cheap to manufacture, simple in form, and long lived in service.

With the above and other objects in view it is proposed, in accordance with this invention, to form a wrist pin from cylindrical stock having the diameter of the body of the finished pin, a peripheral groove being formed in the body near one end and a projecting ring being positioned in the groove to form a head for the wrist pin. The connection between the head and the body thus is spaced from the longitudinal axis of the body whereby not to be interfered with by a lubricating duct formed in the longitudinal axis of the body.

The head can be formed of a ring of stock having either rectangular or cylindrical cross section; can be first formed into a split ring and then sprung into the groove; and finally, the ends of the ring can be spot welded in place, if desired, to make a continuous ring.

Further objects, purposes and characteristic features of the invention will appear as the description progresses, reference being had to the accompanying drawing, showing, solely by way of illustration, and in no manner in a limiting sense, several forms which the invention can assume. In the drawing:—

Figure 1:
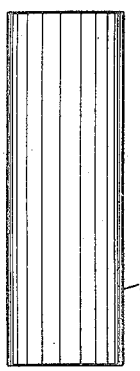
Fig. 1 is a side elevation of a piece of stock forming the body of a wrist pin.
Figure 2:
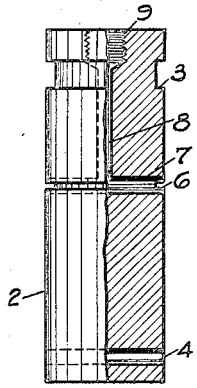
Fig. 2 is a side elevation, with parts shown in section, of the body of a wrist pin with the head removed.

Referring now to the drawing, a piece of cylindrical stock 1, as shown in Fig. 1, is cut to the length of the finished wrist pin and forms the body 2 of the wrist pin. The body 2 is furnished with a peripheral groove 3 of rectangular cross section, near one end of the body, and with a cross bore 4, near the other end of the body, for receiving a retaining cotter pin 5.

For lubricating the outer surface of the body 2 of the pin, a peripheral groove 6 is formed in the body, and is connected by means of a cross bore 7, with a longitudinal axial bore 8, terminating at the head end of the body in an enlarged threaded opening 9, for receiving the nozzle 10 of a grease gun or other lubricating means, whereby lubricant can be forced to the outer surface of the pin body.

Figure 3:
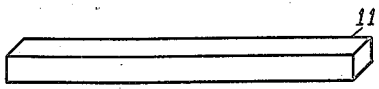
Fig. 3 is a perspective view of a length of rectangular stock used to form the head of the wrist pin.
Figure 5:
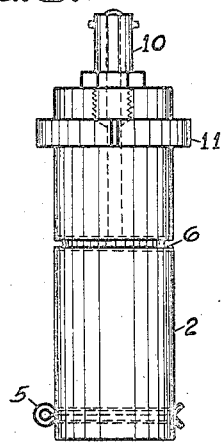
Fig. 5 is an elevational view of the complete wrist pin furnished with a head of the form shown in Fig. 4.
Figure 4:
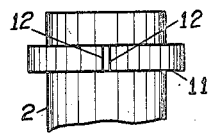
Fig. 4 is a fragmentary elevational view of the body with the head applied thereto in its finished form.

The head of the wrist pin in one form of this invention is formed of a piece of rectangular stock 11, cut to length as shown in Fig. 3, and substantially equal to the diameter of groove 3.

Figure 9:
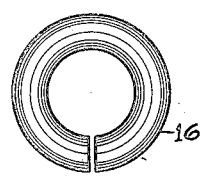
Fig. 9 is a plan view of a third modified form of head.

In another form the piece of stock 14 can be circular in cross section as shown in Fig. 9.

The material forming the pieces of stock 11 and 14 are rather resilient and, as illustrated in Fig. 9 with regard to the piece of stock 14 of circular cross-section, these pieces of stock are formed into rings by pressing or manipulating in any desired manner so as to form a separate ring such as shown in Fig. 9, with the ends practically abutting. This ring, as 16, of Fig. 9, is then sprung open, slid over the end of the body portion, and then allowed to snap into place in the groove in the body portion, the resiliency of the material used to form the ring being sufficient to cause the head to firmly embrace the body, so that ordinarily no further means is necessary for holding the head in place on the body.

Figure 6:
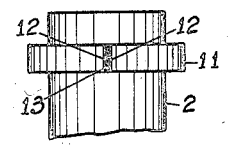
Fig. 6 is a fragmentary elevational view of the body with a first modified form of head.
Figure 7:
Fig. 7 is a perspective view of a length of cylindrical stock used to form a second modified form of head.
Figure 8:
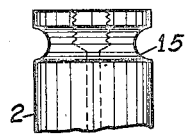
Fig. 8 is a fragmentary elevational view of a modified form of body for receiving a third modified form of head.

In a manner as shown in Fig. 6, if conditions warrant, the ends 12 of the heads formed by members 11 and 16, can be spot-welded or otherwise connected together, in order to form a continuous head member, as at 13, as, for example, as shown in this Fig. 6 in connection with a head of rectangular cross section.

The various above forms of wrist pins all constitute wrist pins which are rugged and simple in construction, cheap to manufacture, and efficient and long lived in operation.

The above rather specific description of various forms of this invention, are given solely by way of illustration, and are not intended, in any manner whatsoever, in a limiting sense. Obviously, the invention can assume various different physical forms, and is susceptible of numerous modifications, and all such forms and modifications, as come within the scope of the appended claims, are intended to be covered by this application.

Having described the invention, it is now claimed:—

1. The method of making wrist pins, comprising, cutting a piece of cylindrical stock to length, forming a peripheral groove near one end of said piece, forming a split ring, of resilient material, and of an internal diameter equal to that of the root of said groove, and an external diameter greater than that of the stock, springing said ring into said groove, and spot welding the ends of said split ring.

2. The method of making wrist pins and the like, comprising, selecting a piece of stock of desired length, forming a peripheral groove in said piece of stock, forming a split ring of a shape complementary to the cross section of the piece of stock, of resilient material and of inner dimensions substantially equal to that of said groove, and an external diameter greater than that of the stock, springing said ring into said groove, and spot welding the ends of the ring.

BEATRICE A. BANNER,
*Executrix of the Estate of Frank H. Banner, Deceased.*